(12) United States Patent
Kundurthy et al.

(10) Patent No.: US 12,455,935 B2
(45) Date of Patent: Oct. 28, 2025

(54) DETERMINING CACHING STRATEGY FOR SEARCH RESULTS

(71) Applicant: Capital One Services, LLC, McLean, VA (US)

(72) Inventors: Maitreya Kundurthy, Plano, TX (US); Nag Prajval Bindumalyam Chandrashekar, Little Elm, TX (US); Gurucharan Manadavadi Prakash, Plano, TX (US); David Gillam, The Colony, TX (US); Fnu Phaneendra Sridhara, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/045,693

(22) Filed: Oct. 11, 2022

(65) Prior Publication Data

US 2024/0119102 A1 Apr. 11, 2024

(51) Int. Cl.
*G06F 16/957* (2019.01)
(52) U.S. Cl.
CPC .............................. *G06F 16/9574* (2019.01)
(58) Field of Classification Search
CPC .................................................. G06F 16/9574
USPC .......................................................... 707/706
See application file for complete search history.

(56) References Cited

U.S. PATENT DOCUMENTS

| | | | | |
|---|---|---|---|---|
| 10,607,271 | B1 * | 3/2020 | Mehta | G06F 16/156 |
| 2008/0168523 | A1 * | 7/2008 | Ansari | H04L 65/1108 |
| | | | | 725/105 |
| 2009/0119375 | A1 * | 5/2009 | Shenfield | H04L 67/56 |
| | | | | 709/206 |
| 2010/0063878 | A1 * | 3/2010 | Bachet | H04N 21/84 |
| | | | | 707/769 |
| 2011/0276623 | A1 * | 11/2011 | Girbal | G06F 16/172 |
| | | | | 709/219 |
| 2013/0332443 | A1 | 12/2013 | Opalinski et al. | |
| 2018/0357304 | A1 * | 12/2018 | Balasubrahmanian | G06F 16/252 |
| 2020/0218724 | A1 * | 7/2020 | Periyathambi | G06F 16/9558 |
| 2021/0200767 | A1 * | 7/2021 | Periyathambi | G06F 16/9558 |
| 2023/0244740 | A1 * | 8/2023 | Sable | H04L 67/568 |
| | | | | 709/203 |

OTHER PUBLICATIONS

"Caching strategies to speed up your API" (May 7, 2020), LogRocket Blog, retrieved from https:blog.logrocket.com/caching-strategies-to-speed-up-your-api/, 13 pages.

* cited by examiner

*Primary Examiner* — Muluemebet Gurmu
(74) *Attorney, Agent, or Firm* — Harrity & Harrity, LLP

(57) ABSTRACT

In some implementations, an edge device may receive a request from a client application indicating one or more search parameters associated with one or more search queries. The edge device may determine an identity of the client application and a type of the request based on the one or more search parameters. The edge device may selectively either cache metadata associated with search results for the one or more search queries or cache the search results, based on the identity of the client application and the type of the request. Accordingly, the edge device may deliver the cached metadata or at least a portion of the cached search results to the client application.

20 Claims, 7 Drawing Sheets

DETERMINING CACHING STRATEGY FOR SEARCH RESULTS

BACKGROUND

Edge devices are often used to reduce latency in accessing services and data provided by a remote server (or a network of remote servers). For example, the edge devices may perform computations and return results to end-user devices. The end-user devices receive the results faster because the edge devices are closer to the end-user devices than remote servers. Additionally, or alternatively, the edge devices may cache data from the remote servers. Accordingly, in some circumstances, the end-user devices receive the data faster because the edge devices are closer to the end-user devices than remote servers.

SUMMARY

Some implementations described herein relate to a system for determining a caching strategy for search results. The system may include one or more memories and one or more processors communicatively coupled to the one or more memories. The one or more processors may be configured to receive, at an edge server, a request from a client application indicating one or more search parameters associated with one or more search queries. The one or more processors may be configured to determine an identity of the client application and a type of the request based on the one or more search parameters. The one or more processors may be configured to selectively either cache metadata associated with search results for the one or more search queries or cache the search results, based on the identity of the client application and the type of the request. The one or more processors may be configured to deliver the cached metadata or at least a portion of the cached search results to the client application.

Some implementations described herein relate to a method of determining a caching strategy for search results. The method may include receiving, at an edge server, a request from a client application associated with one or more search queries. The method may include caching metadata associated with search results, based on the one or more search queries, without caching at least a portion of the search results. The method may include delivering the cached metadata to the client application.

Some implementations described herein relate to a non-transitory computer-readable medium that stores a set of instructions for determining a caching strategy for search results for a device. The set of instructions, when executed by one or more processors of the device, may cause the device to receive a request from a client application indicating one or more search parameters associated with one or more search queries. The set of instructions, when executed by one or more processors of the device, may cause the device to determine an identity of the client application or a type associated with the request based on the one or more search parameters. The set of instructions, when executed by one or more processors of the device, may cause the device to selectively either cache metadata associated with search results based on the one or more search queries or cache the search results, based on the identity of the client application or the type associated with the request. The set of instructions, when executed by one or more processors of the device, may cause the device to deliver the cached metadata or at least a portion of the cached search results to the client application.

DETAILED DESCRIPTION

Figure 1A:
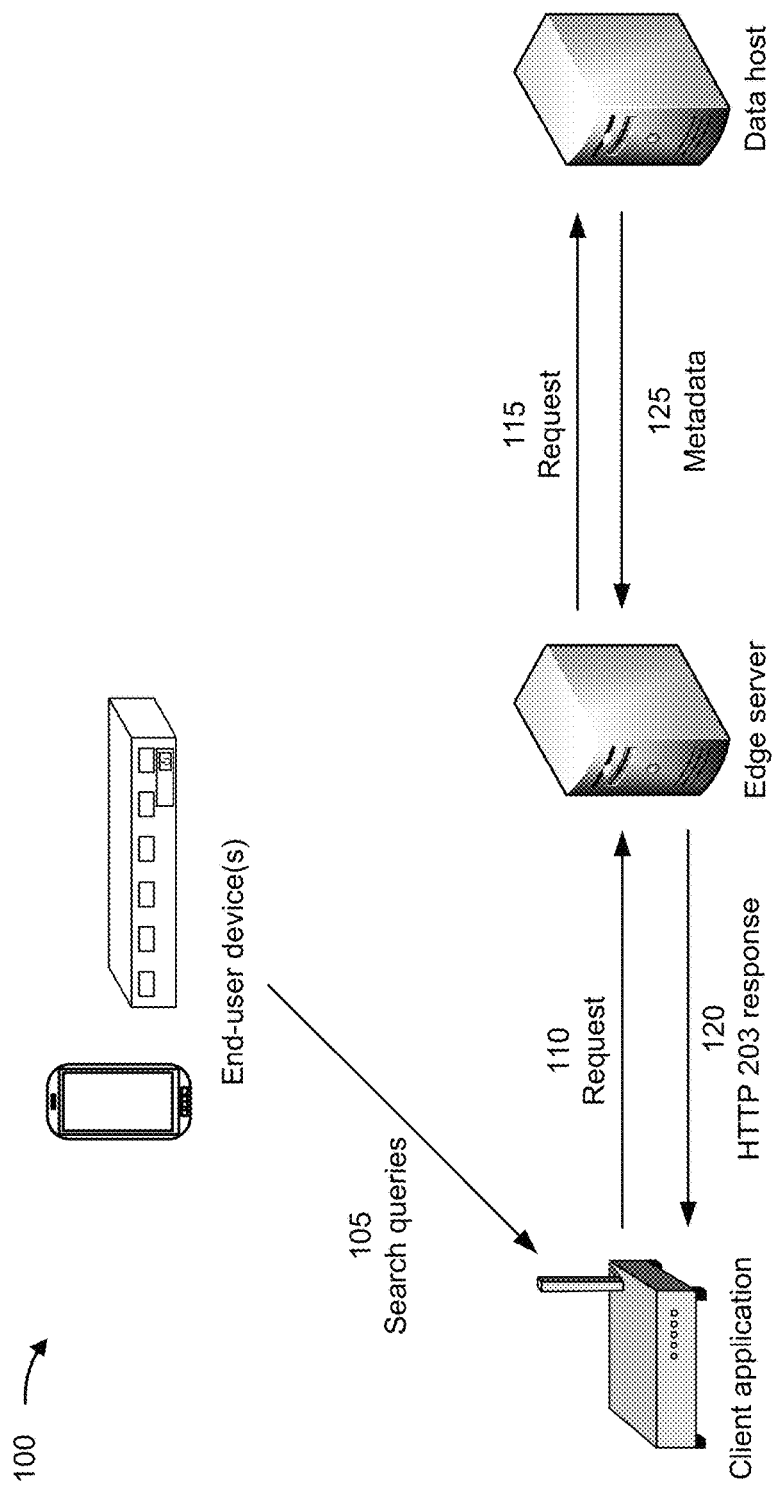
FIGS. 1A-1D are diagrams of an example implementation relating to determining a caching strategy for search results, in accordance with some implementations of the present disclosure.

The following detailed description of example implementations refers to the accompanying drawings. The same reference numbers in different drawings may identify the same or similar elements.

An end-user device, such as a user device or a server associated with an intranet or data aggregation, may access data from a remote server via a search query. A provider of the remote server and/or a network used by the end-user device may provide an edge device to reduce latency associated with serving search results based on the search query. For example, the edge device may cache data from the remote server in order to provide the data to the end-user device faster than the remote server.

Generally, the edge device is configured to perform an eager cache of all search results from the remote server or a lazy cache of little to no data from the remote server. When configured for an eager cache strategy, the edge device caches all data that the edge device receives from the remote server. For example, when the edge device receives data for a webpage from the remote server, the edge device caches all files associated with the webpage. Accordingly, the eager cache strategy tends to waste memory at the edge device because large amounts of data are cached. When configured for a lazy cache strategy, the edge device caches little to no data that the edge device receives from the remote server. For example, when the edge device receives data for a webpage from the remote server, the edge device may cache no files, or only a main file without any associated media files, for the webpage. Accordingly, the lazy cache strategy often increases latency for the end-user device.

Some implementations described herein allow for an edge device to change caching approaches based on an identity of a client application submitting a query and/or a type of a request indicating the query. The query may be a request for a webpage or for search results. Accordingly, the edge device conserves memory when the client application and/or the type of request are indicative of using only part of the webpage or one or two pages of the search results. Further, the edge device reduces latency when the client application and/or the type of request are indicative of using most, if not all, of the webpage or the search results. Additionally, some implementations described herein provide for a hybrid strategy between eager caching and lazy caching for search results. In particular, the edge device may cache metadata associated with the webpage or the search results while caching little to none of the webpage or the search results. The metadata may include hypertext markup language (HTML) tags associated with the webpage or statistics about the search results. Accordingly, the edge device can reduce latency as well as conserve memory when the client application and/or the type of request are indicative of using only a portion of the webpage or one or two pages of the search results.

FIGS. 1A-1D are diagrams of an example 100 associated with determining a caching strategy for search results. As shown in FIGS. 1A-1D, example 100 includes an edge server, a data host, a device implementing a client application, and one or more end-user devices. These devices are described in more detail in connection with FIGS. 2 and 3.

As shown in FIG. 1A and by reference number 105, the end-user device(s) may transmit, and the client application may receive, search queries (e.g., one or more search queries). In one example, one or more users of the end-user device(s) may use the end-user device(s) to access a website (e.g., via web browsers or other similar applications). Accordingly, the user(s) may submit the search queries by interacting with the website (e.g., through a search bar or another similar graphical user interface (GUI)). Additionally, or alternatively, the user(s) of the end-user device(s) may launch applications (or "apps") on the end-user device(s). Accordingly, the user(s) may submit the search queries by interacting with the apps in order to cause the apps to make calls to one or more application programming interfaces (APIs) (e.g., associated with endpoints at the client application) in order to submit the search queries. Additionally, or alternatively, the end-user device(s) may include local servers and/or other types of data aggregators that are configured to collate search results into a database (or another similar type of data structure). Accordingly, the end-user device(s) may automatically perform calls to the API(s) in order to submit the search queries. For example, the end-user device(s) may transmit the search queries periodically in order to collect new search results (and/or remove stale search results). Each search query may include one or more search terms, optionally connected using logical connectors, such as "AND," "OR," or "NOT," among other examples. The end-user device(s) may transmit the search queries in one or more hypertext transfer protocol (HTTP) requests. For example, the end-user device(s) may transmit the search queries to the client application because the client application is associated with processing search queries for the data host. The data host may comprise a repository or another type of device associated with a database providing search results. Although described using search queries, the description similarly applies to the end-user device(s) transmitting queries for website content (e.g., associated with one or more websites).

Accordingly, as shown by reference number 110, the client application may transmit, and the edge server may receive, a request indicating search parameters (e.g., one or more search parameters) associated with the search queries. For example, the client application may transmit an HTTP request that indicates the search parameters in a header (e.g., one or more headers) and the search queries in a body. The search parameters may include properties associated with the search queries (e.g., one or more identities of the end-user device(s) or submission times associated with the search queries, among other examples) and/or properties associated with the client application (e.g., the identity of the client application). In some implementations, the client application may receive search queries from multiple end-user devices and collate the search queries into a single request for the edge server. For example, the client application may receive search queries from multiple end-user devices within an amount of time, the client application may generate an HTTP request for the edge server that includes the search queries from the multiple end-user devices. The client application may transmit the request to the edge server because the edge server is an endpoint for the data host and thus associated with processing requests for the data host.

As shown by reference number 115, the edge server may transmit, and the data host may receive, a request for search results associated with the search queries. The edge server may check whether a cache (e.g., local to the edge server) includes information associated with the search results and may transmit the request to the data host based on determining that the cache does not include information associated with the search results. Accordingly, the edge server may request the search results from the data host.

Based on determining that the cache does not include information associated with the search results, and as shown by reference number 120, the edge server may transmit, and the client application may receive, an HTTP 203 response indicating that cached information is not available. Therefore, the edge server may indicate, to the client application, that the search results are being requested from the data host. Accordingly, the client application is aware that the edge server is waiting to obtain information associated with the search results from the data host. In some implementations, the client application may transmit, and the end-user device(s) may receive, an indication of the wait (e.g., in an HTTP 203 response or an API response). Accordingly, the end-user device(s) may be aware that the client application is waiting for the edge server to obtain information associated with the search results from the data host. In some implementations, the end-user device(s) may display a loading screen or otherwise indicate the wait to the user(s) of the end-user device(s).

After transmitting the HTTP 203 response, the edge server may receive, from the data host, metadata associated with the search results, as shown by reference number 125. The data host may transmit the metadata based on the request from the edge server, as described above. For example, the metadata may indicate a quantity of the search results. Additionally, or alternatively, the metadata may indicate statistics about possible filtering of the search results. For example, for a search query related to vehicles, the statistics might indicate quantities of search results associated with different makes, quantities of search results associated with different models, quantities of search results associated with different years, and/or quantities of search results associated with different conditions, among other examples. In another example, for a search query related to restaurants, the statistics might indicate quantities of search results associated with different price categories, quantities of search results associated with different types of food, quantities of search results associated with different distances from a focal location, and/or quantities of search results associated with different rating categories, among other examples. For implementations where the end-user device(s) submit queries associated with a webpage, rather than search queries, the metadata may include HTML tags associated with the webpage and/or media file information (e.g., file names, file sizes, or file types) associated with the webpage, among other examples.

Figure 1B:
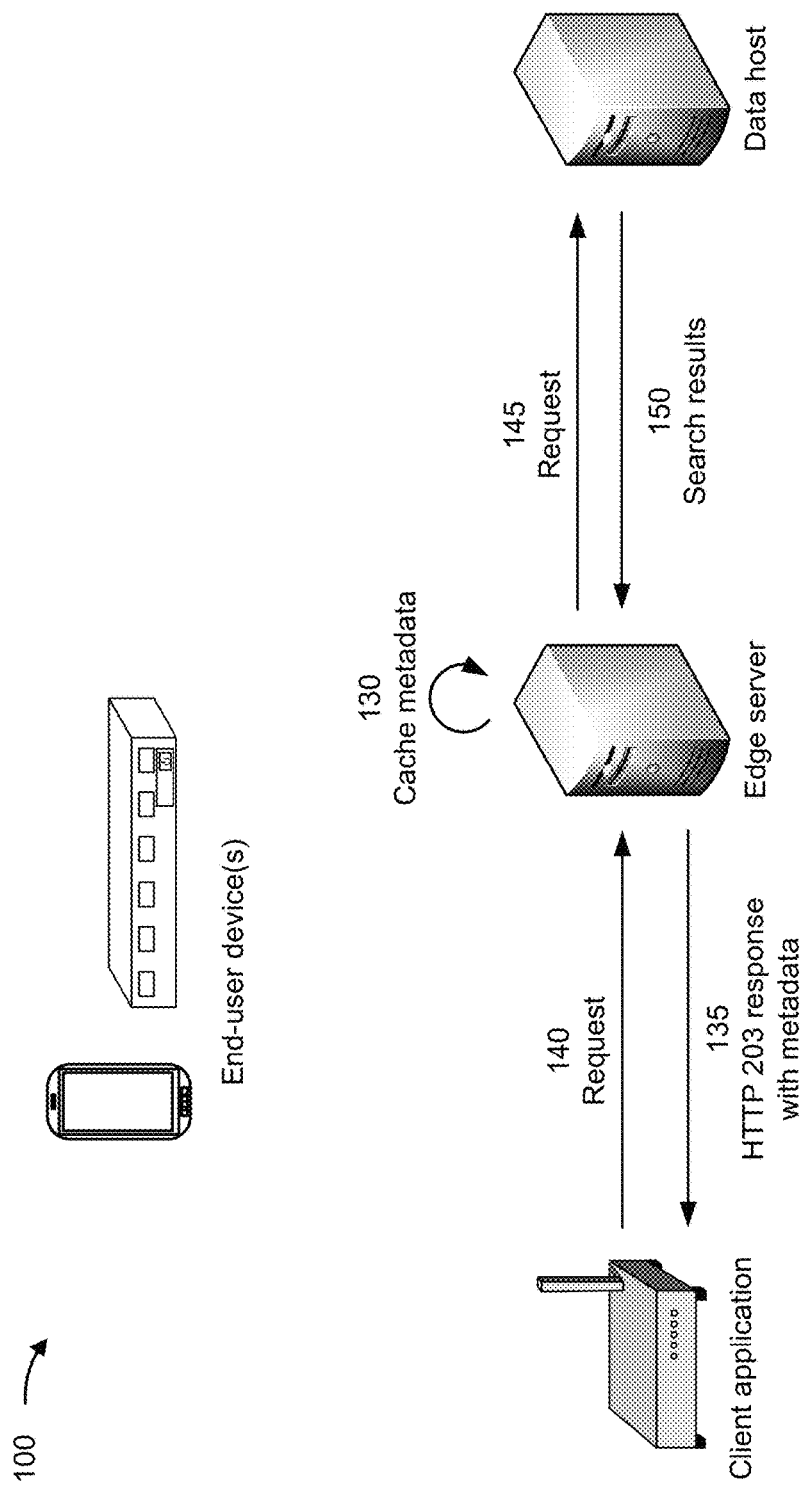

As shown in FIG. 1B and by reference number 130, the edge server may cache the metadata received from the data host. As used herein, "cache" refers to a hardware and/or software component of the edge server that stores information for future retrieval. The cache may be a hardware cache, such as a layer 1 (L1) or layer 2 (L2) cache of a central processing unit (CPU) and/or a graphics processing unit (GPU) of the edge server. Additionally, or alternatively, the cache may be a disk cache, such as a page cache in a memory of the edge server. A "cache hit" refers to when the edge server responds to a request using information in the cache rather than requesting the information from the data host. Conversely, a "cache miss" refers to when the edge server is unable to response to a request using information in the cache and requests the information from the data host. By caching the metadata, the edge server may deliver the cached metadata to additional client applications and/or additional requests from the same client application later in time without requesting the metadata from the data host. As a result, the edge server reduces latency when delivering the cached metadata and conserves network resources that would otherwise have been used to request the metadata from the data host.

Accordingly, as shown by reference number 135, the edge server may deliver, and the client application may receive, the cached metadata. The edge server may transmit the cached metadata in response to the HTTP request from the client application, as described above. For example, the edge server may transmit, and the client application may receive, an HTTP 203 response including the metadata. In some implementations, the edge server may automatically transmit the HTTP 203 response, including the metadata, to the client application after transmitting the HTTP 203 response, indicating that cached information is not available, to the client application. Alternatively, the client application may re-submit the HTTP request to the edge server in response to the HTTP 203 response indicating that cached information is not available. In this case, the edge server transmits the HTTP 203 response, including the metadata, in response to the re-submitted request from the client application.

Furthermore, as shown by reference number 140, the client application may transmit, and the edge server may receive, a request for the search results in response to the HTTP 203 response including the metadata. For example, the client application may transmit another HTTP request to the edge server in order to request the search results. As described in connection with reference number 110, the HTTP request may indicate the search parameters in a header (e.g., one or more headers) and the search queries in a body. In some implementations, the client application may transmit the HTTP request in response to receiving the metadata. For example, the client application may wait to deliver the metadata to the end-user device(s) until at least a portion of the search results are received. Alternatively, the client application may transmit the metadata to the end-user device(s) and may receive a request for at least a portion the search results from the end-user device(s) in response to the metadata. For example, user(s) of the end-user device(s) may view a quantity of the search results as indicated by the metadata and indicate that the user(s) want to view the search results. Accordingly, the client application may transmit the HTTP request, for the search results, to the edge server in response to the request from the end-user device(s).

Accordingly, as shown by reference number 145, the edge server may transmit, and the data host may receive, a request for the search results associated with the search queries. For example, as described above, the edge server may check whether the cache includes the search results, and the edge server may transmit the request based on determining that the cache does not include the search results. In some implementations, the edge server may transmit the request to the data host in response to the HTTP request from the client application, as described in connection with reference number 140. Alternatively, the edge server may transmit the request to the data host based on transmitting the metadata to the client application, as described in connection with reference number 135, and without waiting for an HTTP request from the client application. For example, the edge server may deliver the metadata and assume that the client application also will request at least a portion of the search results. Accordingly, the client application may refrain from transmitting the HTTP request described in connection with reference number 140, and the edge server may transmit the request for at least a portion of the search results independent of whether the client application transmits an HTTP request.

As shown by reference number 150, the edge server may receive, from the data host, at least a portion of the search results associated with the search queries. For example, the data host may provide all search results such that the edge server may determine how many search results to cache and/or deliver to the client application and how many search results to discard. Alternatively, the data host may provide a first portion of the search results (e.g., a first page of the search results, a first two pages of the search results, and so on) without providing a second portion of the search results (e.g., a second page of the search results, a subsequent two pages of the search results, and so on).

Figure 1C:
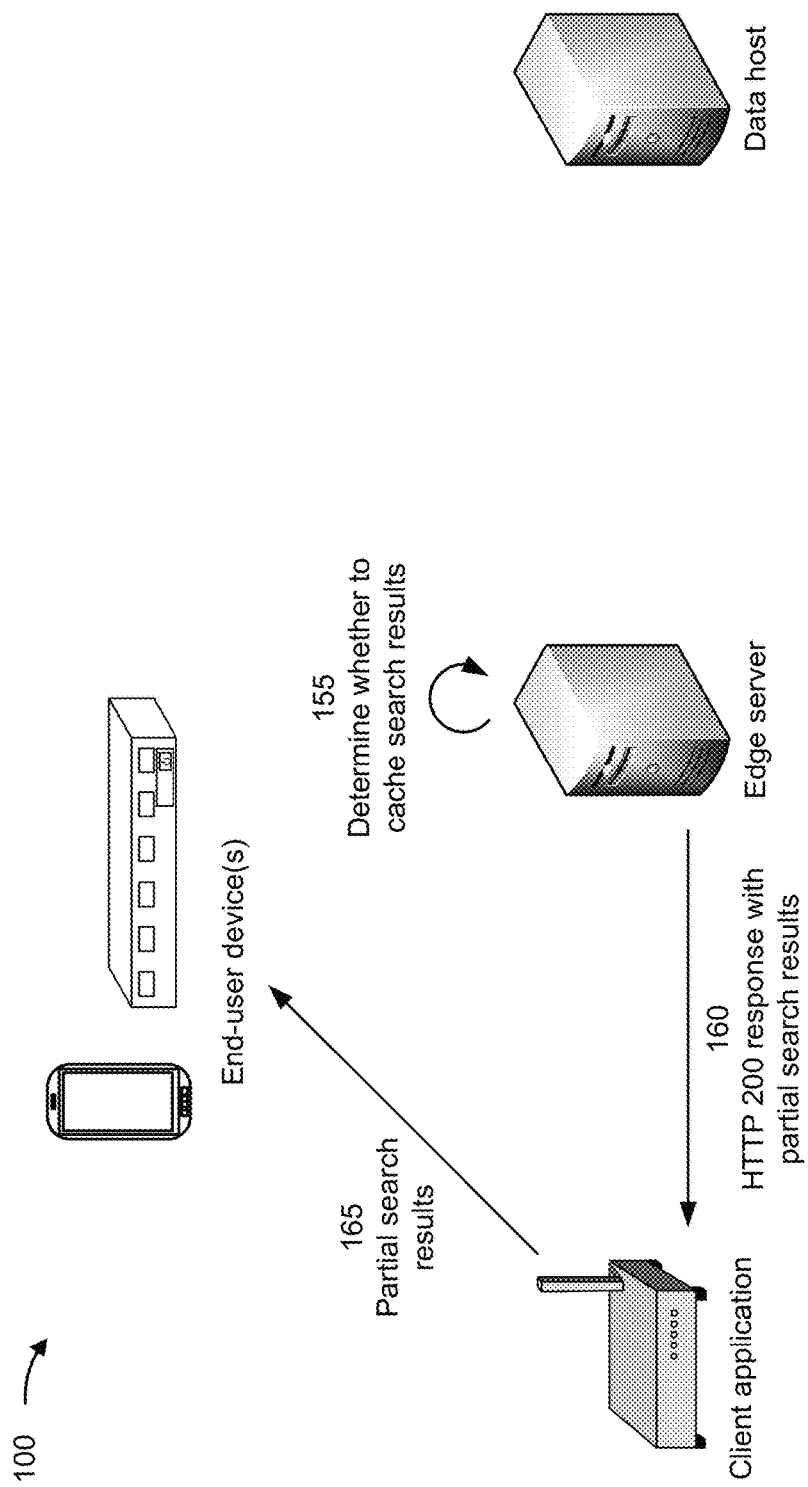

As shown in FIG. 1C and by reference number 155, the edge server may determine whether to cache only the metadata associated with the search results, or to cache the metadata and (at least a portion of) the search results, based on an identity of the client application. For example, the identity of the client application may include a machine name, an Internet protocol (IP) address, a medium access control (MAC) address, and/or another type of identifier unique to the client application. Accordingly, the edge server may use a data structure (e.g., a database and/or another type of data structure that links related items) to determine that the client application is associated with using partial search results (e.g., the client application is associated with user devices, such as smartphones, or the client application is associated with a search aggregator, such as Google®) and thus determine to cache only metadata. In some implementations, the edge server may track requests from the client application and determine, based on historical patterns, that the client application is associated with using partial search results. Accordingly, the edge server may maintain the data structure based on historical patterns of use by the client application. Additionally, or alternatively, the data structure may be stored based on a priori information. For example, the edge server may determine what type of end-user devices are served by the client application (e.g., during a registration process) and accordingly indicate, in the data structure, that the client application is associated with using partial search results. By caching the metadata without caching the search results, the edge server conserves memory at the edge server (which additionally conserves processing resources that otherwise would have been spent on read/write cycles and power that otherwise would have been spent maintaining the search results in the cache). Alternatively, the edge server may determine to cache a portion of the search results (e.g., a first page of the search results, a first two pages of the search results, and so on). Accordingly, the edge server may reduce latency for the client application with respect to the portion of the search results while still conserving memory at the edge server as compared with using an eager cache strategy.

Conversely, the edge server may use the data structure to determine that the client application is associated with using full search results (e.g., the client application is associated with data aggregators or the client application is associated with analytics) and thus determine to cache the search results. In some implementations, the edge server may track requests from the client application and determine, based on historical patterns, that the client application is associated with using full search results. Accordingly, as described above, the edge server may maintain the data structure based on historical patterns of use by the client application. Additionally, or alternatively, the data structure may be stored based on a priori information. For example, the edge server may determine what type of end-user devices are served by the client application (e.g., during a registration process) and accordingly indicate, in the data structure, that the client application is associated with using full search results. By caching the search results, the edge server reduces latency for the client application (which additionally conserves network resources that otherwise would have been spent on multiple requests to the data host).

Additionally, or alternatively, the edge server may determine whether to cache only the metadata associated with the search results, or to cache the metadata and (at least a portion of) the search results, based on a type of the request from the client application. For example, the type of the request may include a source IP address (e.g., one or more source IP addresses) for the request, a source MAC address (e.g., one or more source MAC addresses) for the request, an indication whether the request is associated with input via a graphical user interface (GUI) or via a shell (also referred to as a "command prompt"), and/or a quantity of search results associated with the request, among other examples. In some implementations, the edge server may determine the type of the request based on the search parameters (e.g., included in the header of the request). In some implementations, the edge server may use a data structure (e.g., a database and/or another type of data structure that links related items) to determine that the type of request is associated with user devices (or another type of device associated with using partial search results) and thus determine to cache only metadata. In some implementations, the edge server may track requests from the source IP addresses and/or source MAC addresses and determine, based on historical patterns, that the type of request is associated with using partial search results. Accordingly, the edge server may maintain the data structure based on historical patterns of use. Additionally, or alternatively, the data structure may be stored based on a priori information. For example, the edge server may determine what which source IP addresses and/or source MAC addresses are associated with user devices (e.g., during a registration process) and accordingly indicate, in the data structure, that the type of request is associated with using partial search results. Additionally, or alternatively, the edge server may use conditions to determine that the type of request is associated with user devices (or another type of device associated with using partial search results). For example, when the input is of a first type (e.g., associated with a GUI) and/or a quantity of search results associated with the request satisfies a request threshold, the edge server may determine that the type of request is associated with user devices. By caching the metadata without caching the search results, the edge server conserves memory at the edge server (which additionally conserves processing resources that otherwise would have been spent on read/write cycles and power that otherwise would have been spent maintaining the search results in the cache).

Conversely, the edge server may use the data structure to determine that the type of request is associated with batch updates (or another type of request associated with using full search results) and thus determine to cache the search results. In some implementations, the edge server may track requests from the source IP addresses and/or source MAC addresses and determine, based on historical patterns, that the type of request is associated with using full search results. Accordingly, the edge server may maintain the data structure based on historical patterns of use. Additionally, or alternatively, the data structure may be stored based on a priori information. For example, the edge server may determine what which source IP addresses and/or source MAC addresses are associated with batch updates (e.g., during a registration process) and accordingly indicate, in the data structure, that the type of request is associated with using full search results. Additionally, or alternatively, the edge server may use conditions to determine that the type of request is associated with batch updates (or another type of request associated with using full search results). For example, when the input is of a second type (e.g., associated with a shell) and/or a quantity of search results associated with the request fails to satisfy the request threshold, the edge server may determine that the type of request is associated with batch updates. By caching the search results, the edge server reduces latency for the client application (which additionally conserves network resources that otherwise would have been spent on multiple requests to the data host).

In some implementations, the edge server may use a model to determine whether to cache only the metadata associated with the search results, or to cache the metadata and (at least a portion of) the search results. In some implementations, the model may include a regression algorithm (e.g., linear regression or logistic regression), which may include a regularized regression algorithm (e.g., Lasso regression, Ridge regression, or Elastic-Net regression). Additionally, or alternatively, the model may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the historical patterns described above). For example, for a regression algorithm, a model parameter may include a regression coefficient (e.g., a weight). For a decision tree algorithm, a model parameter may include a decision tree split location, as an example.

Additionally, the edge server may use one or more hyperparameter sets to tune the model. A hyperparameter may include a structural parameter that controls execution of a machine learning algorithm by the edge server, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the model. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

Other examples may use different types of models, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

Accordingly, the edge server may input, to the model, the identity of the client application and/or the type of the request. The edge server may receive, from the model, an indication of whether to cache only the metadata associated with the search results, or to cache the metadata and (at least a portion of) the search results. By using a trained model, the edge server may continue to update the model based on new requests from the client application (and/or other client applications). For example, the edge server may re-train the model after processing a quantity of requests from the client application. As a result, the edge server may continue to improve accuracy of predicting which caching strategy to apply.

As shown by reference number 160, the edge server may deliver, and the client application may receive, a portion of the search results. The edge server may deliver the portion of the search results in response to one or more HTTP requests from the client application, as described above. For example, the edge server may transmit an HTTP 200 response including the portion of the search results. In some implementations, as described above, the search results may not be cached such that the edge server delivers the portion of the search results as received from the data host and then discards the search results received from the data host. Alternatively, as described above, part of the search results may be cached such that the edge server delivers the portion of the search results to the client application and then caches only the part of the search results determined for caching (e.g., a first page of the search results, a first two pages of the search results, and so on). Alternatively, as described above, all of the search results may be cached such that the edge server delivers the portion of the search results to the client application and then caches all search results received from the data host.

As shown by reference number 165, the client application may transmit, and the end-user device(s) may receive, the portion of the search results delivered by the edge server. Accordingly, the client application responds to the search queries from the end-user device(s) with the portion of the search results. Accordingly, the end-user device(s) may display the portion of the search results to the user(s) of the end-user device(s) and/or store the portion of the search results in one or more memories of the end-user device(s).

Figure 1D:
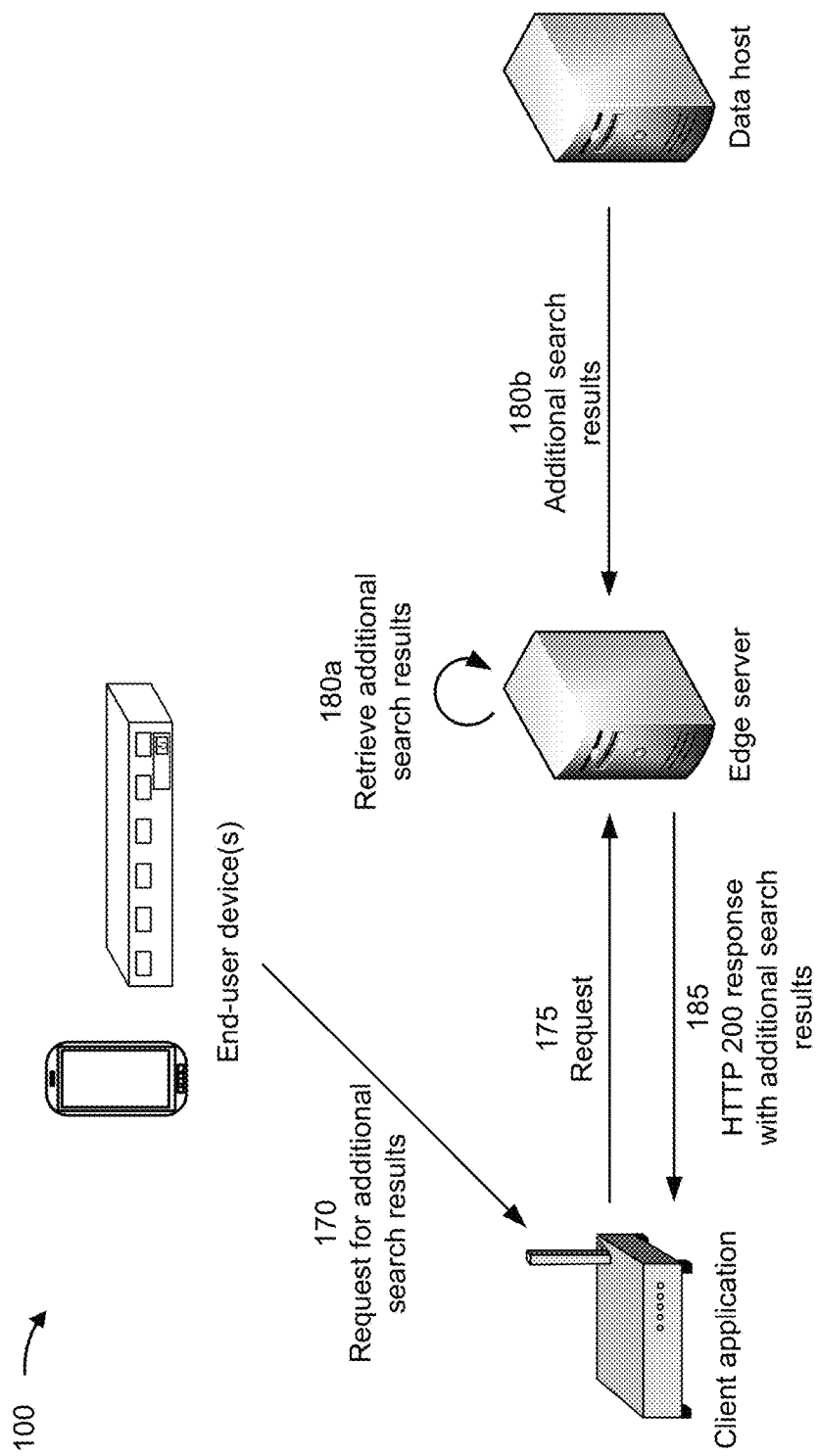

As shown in FIG. 1D and by reference number 170, the end-user device(s) may request additional search results from the client application. For example, a user may instruct one of the end-user devices to display a second (or later) page of the search results. Alternatively, the user may request for a re-sort of the search results that will change which of the search results are included on a currently displayed page. Alternatively, one of the end-user device(s) may request additional search results for a batch update. For example, the end-user device may maintain a database of the search results such that end-user device automatically requests each page of search results from the client application in order to update the database accordingly.

As shown by reference number 175, the client application may transmit, and the edge server may receive, a request for an additional portion of the search results. The client application may transmit the request in response to the request from the end-user device(s), as described above. For example, the request to the edge server may be an additional HTTP request. In some implementations, as described above, the edge server may cache the search results (or at least a portion thereof). Accordingly, as shown by reference number 180a, the edge server may retrieve the additional portion of the search results from the cache when there is a cache hit. Alternatively, as shown by reference number 180b, the edge server may receive the additional portion of the search results from the data host when there is a cache miss. For example, the edge server may transmit a request for the additional portion of the search results to the data host and receive, in response, the additional portion of the search results.

The edge server may transmit, and the client application may receive, an HTTP 200 response including the additional portion of the search results, as shown by reference number 185. The edge server may transmit the additional portion of the search results in response to the additional HTTP request from the client application. The client application may further provide the additional portion of the search results to the end-user device(s). For example, the end-user device(s) may display the additional portion of the search results to the user(s) of the end-user device(s) and/or store the additional portion of the search results in one or more memories of the end-user device(s).

As described above, the edge server may select a caching strategy based on the type of request. Accordingly, the edge server may receive an additional request from the client application associated with additional search queries (e.g., one or more additional search queries). For example, the client application may transmit the additional request to the edge server based on receiving the additional search queries from the same end-user device(s) and/or from one or more additional end-user devices. Accordingly, the edge server may independently determine whether to cache only the metadata associated with additional search results for the additional search queries, or to cache the metadata and (at least a portion of) the additional search results, based on a type of the additional request from the client application.

Additionally, or alternatively, as described above, the edge server may select a caching strategy based on the identity of the client application. Accordingly, the edge server may receive an additional request from an additional client application associated with additional search queries (e.g., one or more additional search queries). For example, the additional client application may serve one or more additional end-user devices and may transmit the additional request to the edge server based on receiving the additional search queries from the additional end-user device(s). Accordingly, the edge server may independently determine whether to cache only the metadata associated with additional search results for the additional search queries, or to cache the metadata and (at least a portion of) the additional search results, based on an identity of the additional client application.

Furthermore, even by caching only the metadata, the edge server reduces latency for the client application (and/or for an additional client application). For example, the edge server may receive an additional request from the client application associated with the same search queries. Accordingly, the edge server may deliver (e.g., in an HTTP 203 response) the cached metadata to the client application. Additionally, or alternatively, the edge server may receive an additional request from an additional client application associated with the same search queries. Accordingly, the edge server may deliver (e.g., in an HTTP 203 response) the cached metadata to the additional client application.

As indicated above, FIGS. 1A-1D are provided as an example. Other examples may differ from what is described with regard to FIGS. 1A-1D.

Figure 2:
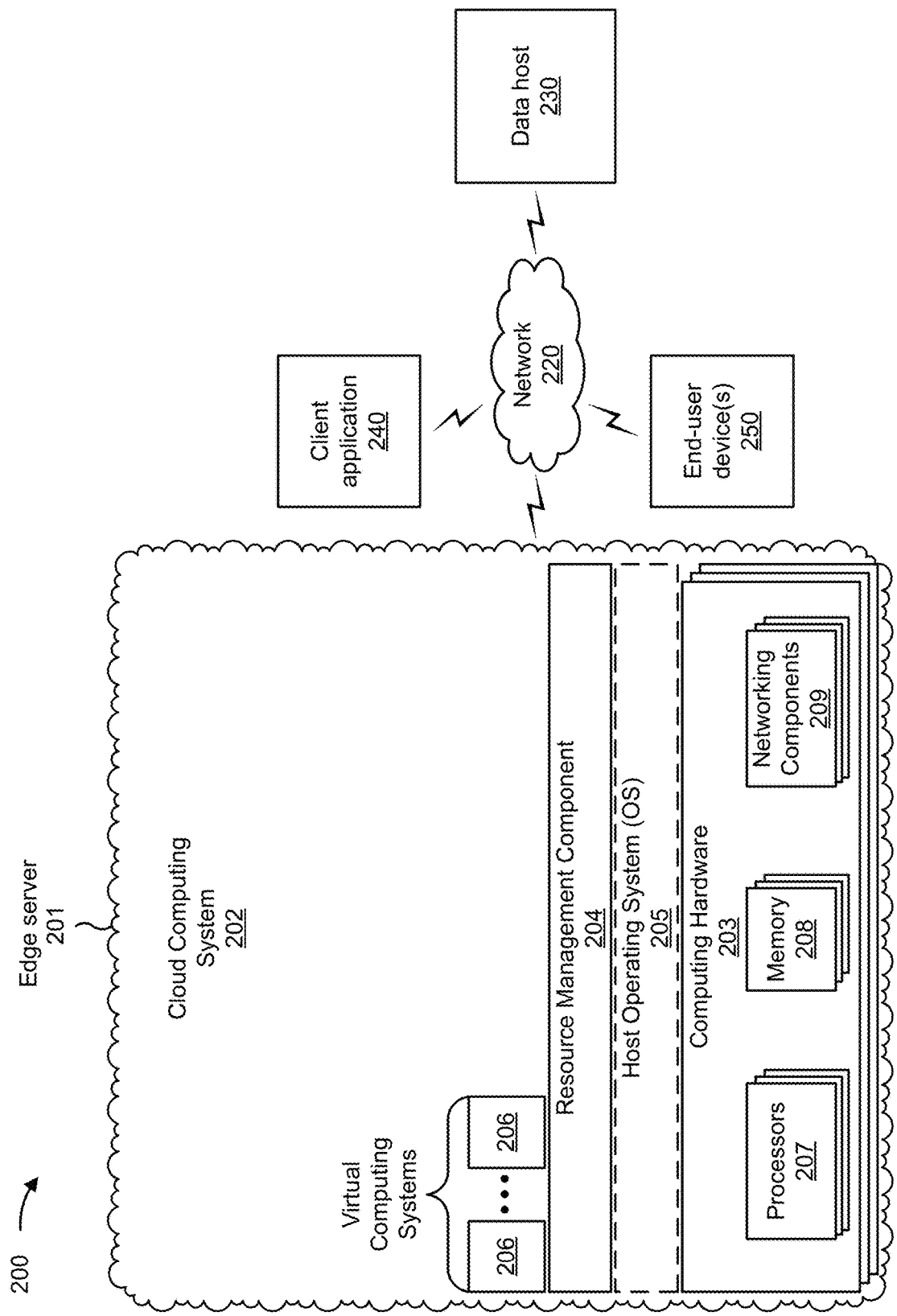
FIG. 2 is a diagram of an example environment in which systems and/or methods described herein may be implemented, in accordance with some implementations of the present disclosure.

FIG. 2 is a diagram of an example environment 200 in which systems and/or methods described herein may be implemented. As shown in FIG. 2, environment 200 may include an edge server 201, which may include one or more elements of and/or may execute within a cloud computing system 202. The cloud computing system 202 may include one or more elements 203-209, as described in more detail below. As further shown in FIG. 2, environment 200 may include a network 220, a data host 230, a device implementing a client application 240, and/or one or more end-user devices 250. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines. Additionally, or alternatively, the resource management component 204 may include a container manager, such as when the virtual computing systems 206 are containers. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine, a container, or a hybrid environment that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the edge server 201 may include one or more elements 203-209 of the cloud computing system 202, may execute within the cloud computing system 202, and/or may be hosted within the cloud computing system 202, in some implementations, the edge server 201 may not be cloud-based (e.g., may be implemented outside of a cloud computing system) or may be partially cloud-based. For example, the edge server 201 may include one or more devices that are not part of the cloud computing system 202, such as device 300 of FIG. 3, which may include a stand-alone server or another type of computing device. The edge server 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The data host 230 may include one or more devices capable of receiving, generating, storing, processing, and/or providing information associated with search results, as described elsewhere herein. The data host 230 may include a communication device and/or a computing device. For example, the data host 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device.

The client application 240 may be implemented on one or more devices capable of receiving, processing, storing, routing, and/or providing traffic (e.g., a packet and/or other information or metadata) in a manner described herein. For example, the client application 240 may be implemented on a router, such as a label switching router (LSR), a label edge router (LER), an ingress router, an egress router, a provider router (e.g., a provider edge router or a provider core router), a virtual router, or another type of router. Additionally, or alternatively, the client application 240 may be implemented on a gateway, a switch, a firewall, a hub, a bridge, a reverse proxy, a server (e.g., a proxy server, a cloud server, or a data center server), a load balancer, and/or a similar device. In some implementations, the client application 240 may be implemented on a physical device implemented within a housing, such as a chassis. In some implementations, the client application 240 may be implemented on a virtual device implemented by one or more computing devices of a cloud computing environment or a data center. In some implementations, a group of client applications 240 may be implemented on a group of data center nodes that are used to route traffic flow through a network.

The end-user device(s) 250 may include one or more devices capable of receiving, generating, storing, processing, and/or providing information associated with search results, as described elsewhere herein. The end-user device(s) 250 may include a communication device and/or a computing device. For example, the end-user device(s) 250 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. Additionally, or alternatively, the end-user device(s) 250 may include a database, a server, a database server, or a similar device that aggregates search results.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
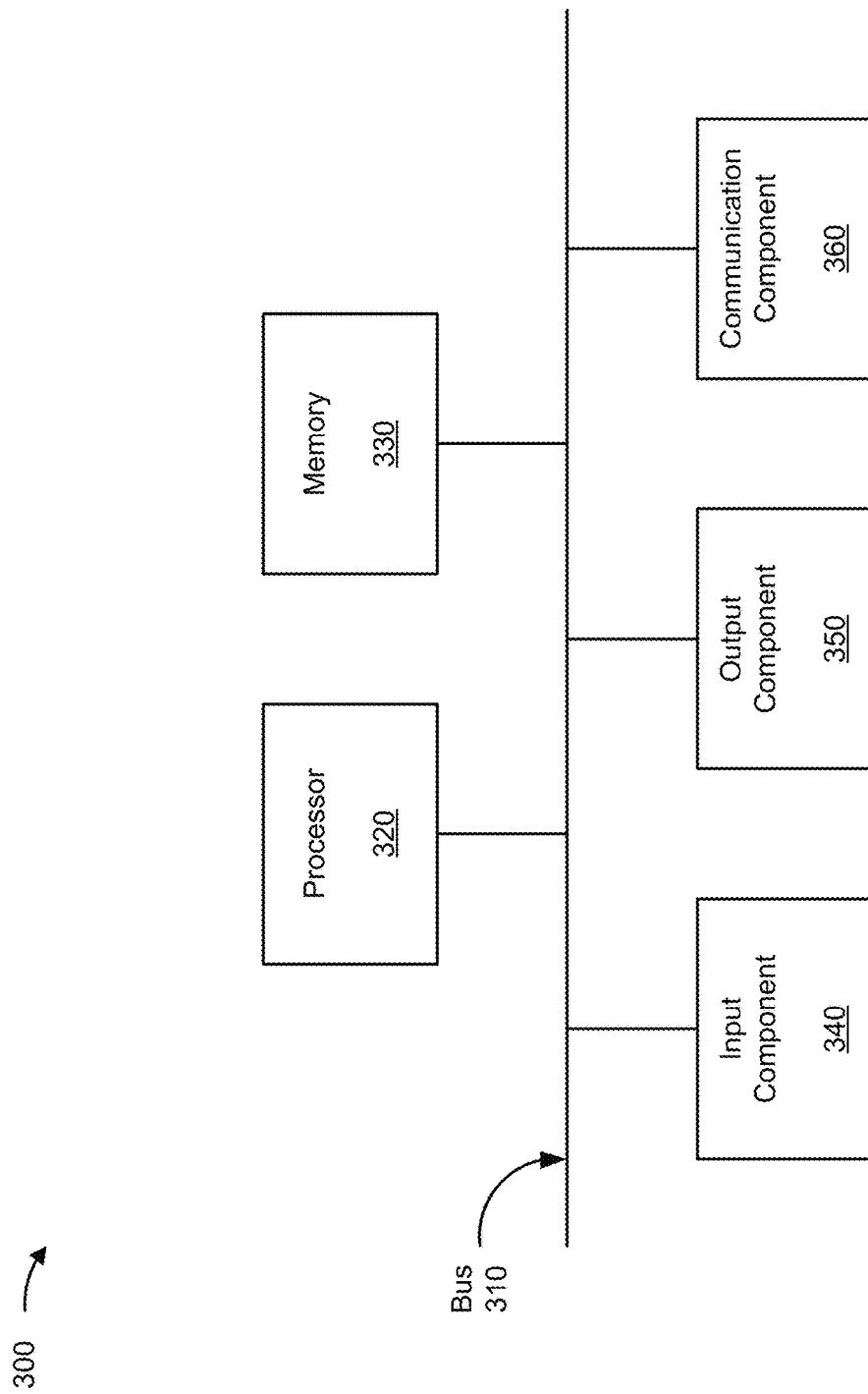
FIG. 3 is a diagram of example components of one or more devices of FIG. 2, in accordance with some implementations of the present disclosure.

FIG. 3 is a diagram of example components of a device 300 associated with determining a caching strategy for search results. Device 300 may correspond to an edge server 201, a data host 230, a device implementing a client application 240, and/or an end-user device 250. In some implementations, edge server 201, the data host 230, the device implementing a client application 240, and/or the end-user device 250 may include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. Processor 320 may include a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 may include one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 may include one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
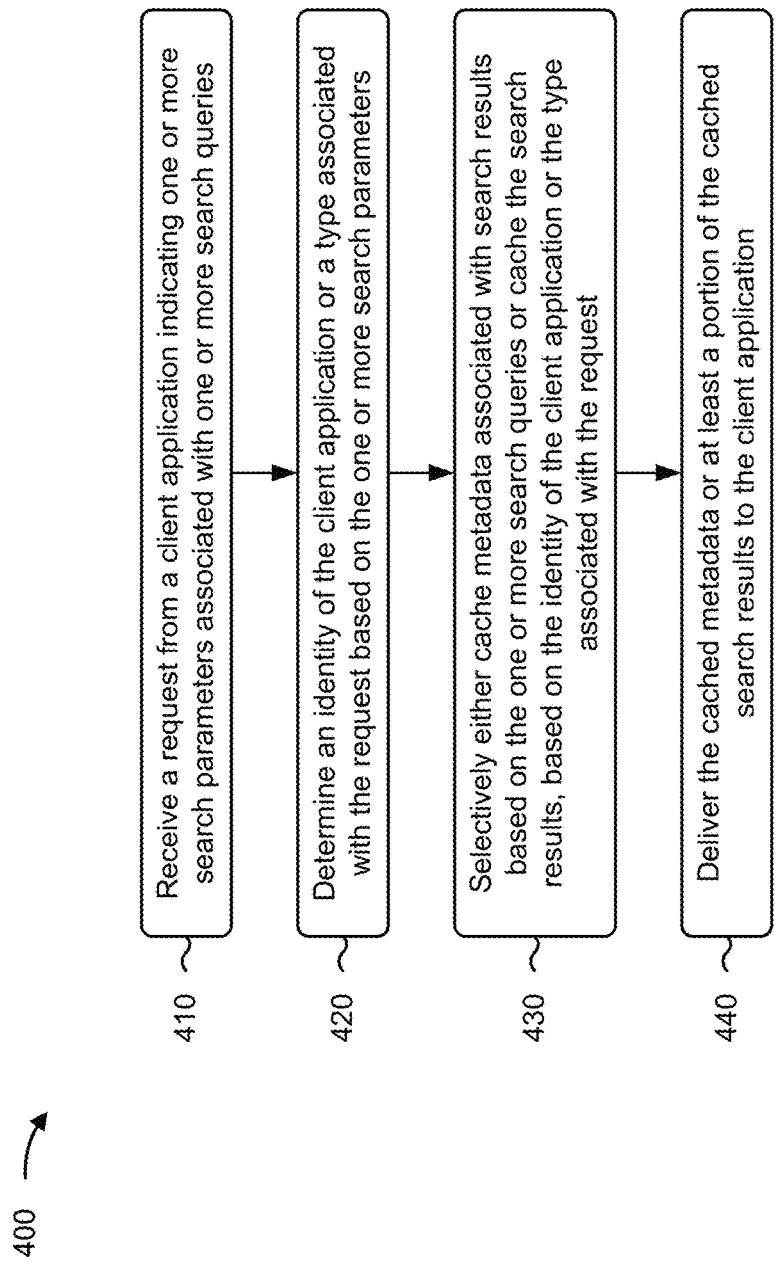
FIG. 4 is a flowchart of an example process relating to determining a caching strategy for search results, in accordance with some implementations of the present disclosure.

FIG. 4 is a flowchart of an example process 400 associated with determining a caching strategy for search results. In some implementations, one or more process blocks of FIG. 4 may be performed by the edge server 201. In some implementations, one or more process blocks of FIG. 4 may be performed by another device or a group of devices separate from or including the edge server 201, such as the data host 230, a device implementing the client application 240, and/or the end-user device(s) 250. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving a request from a client application indicating one or more search parameters associated with one or more search queries (block 410). For example, the edge server 201 (e.g., using processor 320, memory 330, input component 340, and/or communication component 360) may receive a request from a client application indicating one or more search parameters associated with one or more search queries, as described above in connection with reference number 110 of FIG. 1A. As an example, the edge server 201 may receive an HTTP request that indicates the search parameters in a header (e.g., one or more headers) and the search queries in a body. In some implementations, the client application may aggregate search queries from multiple end-user devices and collate the search queries into a single request for the edge server.

As further shown in FIG. 4, process 400 may include determining an identity of the client application or a type associated with the request based on the one or more search parameters (block 420). For example, the edge server 201 (e.g., using processor 320 and/or memory 330) may determine an identity of the client application or a type associated with the request based on the one or more search parameters, as described above in connection with reference number 155 of FIG. 1C.

As further shown in FIG. 4, process 400 may include selectively either caching metadata associated with search results based on the one or more search queries or caching the search results, based on the identity of the client application or the type associated with the request (block 430). For example, the edge server 201 (e.g., using processor 320 and/or memory 330) may cache metadata associated with search results based on the one or more search queries, or cache the search results, based on the identity of the client application or the type associated with the request, as described above in connection with reference number 155 of FIG. 1C. As an example, the edge server 201 may cache the metadata based on the identity of the client application being associated with using partial search results and/or the type of the request being associated with user devices. Alternatively, the edge server 201 may cache the search results based on the identity of the client application being associated with using full search results and/or the type of the request being associated with batch updates.

As further shown in FIG. 4, process 400 may include delivering the cached metadata or at least a portion of the cached search results to the client application (block 440). For example, the edge server 201 (e.g., using processor 320 and/or memory 330) may deliver the cached metadata or at least a portion of the cached search results to the client application, as described above in connection with reference number 135 of FIG. 1B and/or reference number 160 of FIG. 1C. As an example, the edge server may deliver the cached metadata and deliver (at least a portion of) the search results from the cache or from a data host.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1D. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for determining a caching strategy for search results, the system comprising:
one or more memories; and
one or more processors, coupled to the one or more memories, configured to:

receive, at an edge server, a request from a client application indicating one or more search parameters associated with one or more search queries;

determine an identity of the client application and a type of the request based on the one or more search parameters;

use a data structure, including identifiers and historical data, to determine whether to cache metadata associated with search results for the one or more search queries or to cache the search results, wherein the data structure associates the identity of the client application or the type of the request with using partial search results or full search results, and wherein the edge server maintains the data structure based on historical patterns;

selectively cache the metadata or cache the search results based on the identity of the client application and the type of the request, wherein a caching decision is based on predefined rules or criteria that are updated by the edge server based on the historical patterns; and deliver the cached metadata or at least a portion of the cached search results to the client application.

2. The system of claim 1, wherein the one or more processors, to deliver the cached metadata, are configured to:
transmit a hypertext transfer protocol 203 response including the metadata.

3. The system of claim 1, wherein the one or more processors, to deliver the at least the portion of the cached search results, are configured to:
transmit a hypertext transfer protocol 200 response including the portion of the cached search results.

4. The system of claim 1, wherein the one or more processors are further configured to:
transmit a hypertext transfer protocol (HTTP) 203 response indicating that cached information is not available; and
receive the metadata associated with the search results after transmitting the HTTP 203 response.

5. The system of claim 1, wherein the one or more processors, to selectively either cache the metadata or cache the search results, are configured to:
cache the metadata based on the identity of the client application being associated with using the partial search results and the type of the request being associated with one or more user devices.

6. The system of claim 1, wherein the one or more processors, to selectively either cache the metadata or cache the search results, are configured to:
cache the search results based on the identity of the client application being associated with using the full search results and the type of the request being associated with one or more batch updates.

7. A method of determining a caching strategy for search results, comprising:
receiving, at an edge server, a request from a client application associated with one or more search queries;
using a data structure, including identifiers and historical data, to determine whether to cache metadata associated with search results for the one or more search queries or to cache the search results, wherein the data structure associates an identity of the client application with using partial search results or full search results, and wherein the edge server maintains the data structure based on historical patterns;
caching the metadata associated with search results, based on the one or more search queries, without caching at least a portion of the search results, wherein a caching decision is based on predefined rules or criteria that are updated by the edge server based on the historical patterns; and
delivering the cached metadata to the client application.

8. The method of claim 7, further comprising:
receiving, at the edge server, a request from the client application for a first portion of the search results;
receiving the first portion of the search results from a data host; and
delivering the first portion of the search results to the client application.

9. The method of claim 7, further comprising:
caching a first portion of the search results from a data host; and
delivering the cached first portion of the search results to the client application.

10. The method of claim 9, further comprising:
receiving, at the edge server, a request from the client application for a second portion of the search results;
receiving the second portion of the search results from the data host; and
delivering the second portion of the search results to the client application.

11. The method of claim 7, further comprising:
receiving, at the edge server, an additional request from the client application associated with one or more additional search queries;
caching additional metadata and additional search results based on the one or more additional search queries;
delivering the additional metadata to the client application; and
delivering at least a portion of the additional search results to the client application.

12. The method of claim 7, further comprising:
receiving, at the edge server, an additional request from an additional client application associated with the one or more search queries; and
delivering the cached metadata to the additional client application.

13. The method of claim 7, further comprising:
receiving, at the edge server, an additional request from the client application associated with the one or more search queries; and
delivering the cached metadata to the client application.

14. The method of claim 7, wherein the metadata indicates a quantity of the search results.

15. A non-transitory computer-readable medium storing a set of instructions for determining a caching strategy for search results, the set of instructions comprising:
one or more instructions that, when executed by one or more processors of a device, cause the device to:
receive a request from a client application indicating one or more search parameters associated with one or more search queries;
determine an identity of the client application or a type associated with the request based on the one or more search parameters;
use a data structure, including identifiers and historical data, to determine whether to cache metadata associated with search results for the one or more search queries or to cache the search results, wherein the data structure associates the identity of the client application with using partial search results or full search results, and wherein an edge server maintains the data structure based on historical patterns;

selectively cache the metadata based on the one or more search queries or cache the search results, based on the identity of the client application or the type associated with the request, wherein a caching decision is based on predefined rules or criteria that are updated by the edge server based on the historical patterns; and deliver the cached metadata or at least a portion of the cached search results to the client application.

16. The non-transitory computer-readable medium of claim 15, wherein the one or more instructions, when executed by the one or more processors, further cause the device to:

transmit a hypertext transfer protocol (HTTP) 203 response indicating that cached information is not available; and receive the metadata associated with the search results after transmitting the HTTP 203 response.

17. The non-transitory computer-readable medium of claim 15, wherein the one or more instructions, that cause the device to deliver the cached metadata, cause the device to:

transmit a hypertext transfer protocol (HTTP) 203 response including the cached metadata; and receive the search results after transmitting the HTTP 203 response.

18. The non-transitory computer-readable medium of claim 17, wherein the one or more instructions, when executed by the one or more processors, further cause the device to:

transmit an HTTP 200 response including the at least the portion of the search results.

19. The non-transitory computer-readable medium of claim 17, wherein the one or more instructions, when executed by the one or more processors, further cause the device to:

transmit an HTTP 200 response including at least a first portion of the cached search results; and transmit an HTTP 200 response including at least a second portion of the cached search results.

20. The non-transitory computer-readable medium of claim 15, wherein the one or more instructions, when executed by the one or more processors, further cause the device to:

receive the metadata from a data host based on the one or more search queries.

* * * * *